UNITED STATES PATENT OFFICE.

ANSON GARDNER BETTS, OF TROY, NEW YORK.

TREATING ANODE SLIME FROM THE ELECTROLYTIC REFINING OF LEAD.

No. 891,396.  Specification of Letters Patent.  Patented June 23, 1908.

Application filed February 20, 1907. Serial No. 358,430.

*To all whom it may concern:*

Be it known that I, ANSON GARDNER BETTS, a citizen of the United States, residing at Troy, in the county of Rensselaer and State of New York, have invented certain new and useful Improvements in Treating Anode Slime from the Electrolytic Refining of Lead, of which the following is a specification.

This invention relates to the direct fusion of oxidized or partly oxidized slime.

The object of my invention is to accomplish this fusion at such a low temperature that there is little or no loss by volatilization. Lead refinery slime by drying can usually be oxidized to a considerable extent, and this oxidation may often be advantageously carried further by roasting, as a preparation for further treatment, since by roasting a more uniform product is obtained, which is desirable in commercial practice, and with some varieties of slime roasting is necessary to get sufficient oxidation for successful treatment as described herein.

In melting partially oxidized slime for the production of a slag containing most of the antimony and a large part of the lead, the metallic product containig the silver is apt to be rather difficultly fusible, and the temperature must then be brought to a point where antimony trioxid volatilizes very fast. This is particularly disadvantageous when the proportion of precious metals in the slime is only a small one. According to my present invention, I get around that difficulty and others, by mixing the oxidized slime with sulfur, in the correct proportion, and then melting. Any antimony pentoxid present is reduced, presumably by the action of sulfur, to the fusible trioxid, and the silver and copper and part of the lead combine with sulfur to form a very fusible matte, melting at a low red heat. The slag also melts at a red heat or below, and I have been able to carry out the fusion successfully even in an iron pot.

An example of the process, 100 parts of air oxidized slime of the analyses given, melted with 8 parts of sulfur, gave matte and slag of the analyses given.

|    | Slime.  | Matte.  | Slag.  |
|----|---------|---------|--------|
| Ag | 15.8 %  | 34.0 %  |        |
| Cu | 8.1 %   | 19.2 %  | 0.2%   |
| Sb | 25.7 %  | 4.8 %   | 51.4%  |
| Pb | 14.4 %  | 24.8 %  | 12.1%  |
| As | 6.3 %   |         | 5.2%   |
| Au | .12%    | .25%    |        |
| Fe |         |         | 3.0%   |

100 parts of the same slime with 6 parts of sulfur gave a matte containing considerably less lead, namely, 5.8% and quite as fusible (which is a somewhat better result, the presence of lead and antimony in the matte being undesirable).

For varying qualities of slime and degrees of oxidation, varying proportions of sulfur are required, best determined by test.

When melted in a plain iron pot, the slag sontained 8.25% iron, showing the pot to be comewhat attacked. The matte has, however, little or no action on the iron at the low temperature necessary, so by using a pot with a bath of matte partly filling it, and a lining of refractory material around the upper part, slime may be melted down satisfactorily.

The slag I may treat by leaching out the antimony with hydrofluoric acid, and depositing antimony from the solution, or by bringing the ground slag on a horizontal cathode (lead is suitable) in acid or alkaline solution, a solution of sulfuric acid being especially convenient, and reducing it by the electric current. The reduction takes place readily, with a current density of about 30 amperes per square foot and a tension, using a lead anode, of about 2.3 volts. When the reduction is nearly complete I may fuse the product to a moderately pure antimony, which can be refined electrolytically.

I have also smelted similar slags, with the addition of litharge, to hard lead.

Sulfur for melting down may be replaced in whole or in part by other suitable materials containing sulfur, antimony sulfid being especially adaptable, the antimony going into the slag and the sulfur into the matte, while any precious metals of the antimony sulfid go into the matte. Also carbon may be added to assist in the reduction of super-oxidized antimony compounds, thereby economizing in sulfur.

I have treated the matte, by blowing air through to convert it into doré bullion, but prefer to treat it as follows: The ground matte is mixed with sufficient sulfuric acid to carry out these reactions.

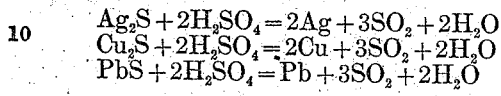

$$Ag_2S + 2H_2SO_4 = 2Ag + 3SO_2 + 2H_2O$$
$$Cu_2S + 2H_2SO_4 = 2Cu + 3SO_2 + 2H_2O$$
$$PbS + 2H_2SO_4 = Pb + 3SO_2 + 2H_2O$$

These reactions do not take place in the simple manner indicated, which give only the approximate net result. The first stage of the reaction is the formation of sulfates from part of the matte, and the reaction of these sulfates at higher temperatures on the still undecomposed sulfids. A sample of doré bullion made in this way contained 63% silver, 32% copper and 0.4% gold.

I may also use an excess of sulfuric acid, converting the matte entirely into sulfates, and working up the copper and silver sulfates, and the gold residue containing lead sulfate, in the usual manner.

My invention is not limited to the fusion of the merely oxidized but otherwise untreated slime, but certain advantages are offered by it in the treatment of slime from which certain important constituents have been already to a large extent eliminated by chemical or electrochemical methods.

After removal of a large part of the silver, copper and arsenic by the known ferric sulfate or similar methods for example, the residue consisting largely of antimony trioxid with or without lead sulfate, according to the nature of the previous treatment, may now be melted down to a fusible matte and slag, thereby preventing much loss by volatilization or difficult furnacing. Particularly if the silver has been removed to a large extent by previous chemical treatment, so that only a small amount of matte is produced to be treated, my present process effects an economy over fusion to metal and slag.

What I claim as new and desire to secure by Letters Patent is:

1. The process of treating anode slime from the electrolytic refining of lead which consists in oxidizing the slime, and fusing it with the addition of material containing sulfur to form a fusible slag containing antimony trioxid, and a matte.

2. The process of treating anode slime from the electrolytic refining of lead, which consists in oxidizing the slime, and fusing it with the addition of material containing sulfur, to a matte and a slag.

3. The process of treating anode slime from the electrolytic refining of lead, which consists in oxidizing the slime, and fusing it with the addition of antimony sulfid, to produce a slag containing most of the antimony, and a matte containing most of the precious metals present.

4. The process of treating anode slime from the electrolytic refining of lead, which consists in oxidizing the slime, and melting it with the addition of material containing sulfur to produce a slag containing most of the lead and antimony and a matte containing most of the copper and silver.

In testimony whereof I have hereunto signed my name in the presence of two subscribing witnesses.

ANSON GARDNER BETTS.

Witnesses:
SARA A. MALLORY,
ETHEL K. BETTS.